April 14, 1970    M. G. GAUTRAUD ET AL    3,506,264
PIN DETECTION SYSTEM Filed Sept. 23, 1968                                        8 Sheets-Sheet 1

Fig.1.

Inventors:-
Michael G. Gautraud,
Robert Torresen,
Herbert D. Grosvenor,
By Hofgren, Wegner, Allen, Stellman & McCord
Attys.

Fig. 2.

April 14, 1970   M. G. GAUTRAUD ET AL   3,506,264
PIN DETECTION SYSTEM
Filed Sept. 23, 1968   8 Sheets-Sheet 4

3,506,264
Patented Apr. 14, 1970

3,506,264
PIN DETECTION SYSTEM
Michael G. Gautraud and Robert Torresen, Muskegon, and Herbert D. Grosvenor, Whitehall, Mich., assignors to Brunswick Corporation, a corporation of Delaware
Filed Sept. 23, 1968, Ser. No. 761,577
Int. Cl. A63d 5/00, 5/04
U.S. Cl. 273—43                                                                                16 Claims

ABSTRACT OF THE DISCLOSURE

Apparatus for automatically determining pinfall for computing bowling scores for a plurality of players including two pinfall detection systems, one associated with an automatic pinsetter deck and normally operative after each ball to detect pinfall, and the other associated with the pinsetter cross conveyor and operative in event of standing pins outside the range of the deck detection system. The apparatus also includes extension plates disposed at each side of the bowling pin setting deck structure to enlarge the out-of-range detection area of said structure.

BACKGROUND OF THE INVENTION

The present invention relates to pinfall detection systems associated with automatic pinseters and adapted for supplying pinfall information to automatic scorekeeping apparatus. In particular, the invention is directed to pin detection apparatus adapted for use with commercially available pinsetters such as those made by Brunswick Corporation, though utility need not be so limited. In the past, the Brunswick pinsetter has been made with a deck structure for setting pins initially, for lifting standing pins after first ball while deadwood is removed and for resetting the lifted pins. The pin pickup and resetting mechanism includes a plurality of resilient pads to engage the heads of standing pins to hold the pins to be gripped by scissors mechanisms. The resilient pads and associated scissors mechanism are aligned with pinspots on the bowling lane surface and are adapted to accommodate pins standing on spot and off spot within a predetermined area surrounding each spot. Pins which "walk" off spot and remain standing outside the areas of the resilient pads and scissors mechanisms are referred to as out-of-range pins and require attention of an attendant. Sanford Patent 2,817,528 illustrates a pin pickup and resetting mechanism of the character mentioned.

As automatic pinsetters became commercially successful, it became desirable to provide indication of standing pins by lighted lamps as a result of which a pin detection system was developed including a plate disposed in each resilient pad to operate a switch plunger on movement of the plate when the pad is compressed by contact with a standing pin. A pin detection system of the type described is disclosed in Torresen Patent 3,278,186.

Later, automatic scorekeepers were developed for computing the scores of bowlers automatically based upon pinfall values determined automatically. Toward such an end, use has been made of a pinfall detection system like that referred to above. However, on infrequent occurrence of an out-of-range pin, the detection system does not supply pinfall information to the scorekeeping apparatus as a result of which the pinfall values are introduced manually. Association of the pin detection system with automatic scorekeeping apparatus is described in Walker application Ser. No. 612,665, filed Jan. 30, 1967, assigned to the assignee of this application. That application also describes association of the scorekeeper with the pinsetter.

In order to automatically provide pinfall information to a scorekeeping apparatus as accurately as possible in all events including out-of-range pin situations, it is desirable to have a pin detection system operable in the case of a pin out of range of the pinsetter pickup mechanism and out of range of the normal pin detection means.

SUMMARY OF THE INVENTION

Acording to the present invention, a separate pin detecting means is provided for out-of-range pin situations, and operation of the scorekeeper is automatic in case of an out-of-range pin.

It is an object of the invention to provide in an automatic pinsetter deck structure a deck plate having an enlarged surface area engageable with the heads of standing pins not within reach of a pickup and detecting mechanism to stop the deck structure at a level indicating an out-of-range pin.

It is also an object of the invention to provide in association with an automatic pinsetter including a pin pickup mechansm, a primary pin detection system adapted to determine pinfall when there are no standing pins out-of-range of the pickup mechanism, and an auxiliary pin detection system operable in event of a standing pin out-of-range of the pickup mechanism.

Another object is to provide an auxiliary pin detection and counting means in association with a pin handling mechanism in a pinsetter for supplying pinfall information in event of a standing pin out-of-range of a primary detecting system, including a normally inoperative counter responsive to the passage of fallen pins handled by said pin handling mechanism, means for detecting a standing out-of-range pin, and means responsive to determination of an out-of-range pin for enabling the counter.

An object of the invention is to provide an auxiliary pin detection and counting means in association with a pin handling mechanism in a pinsetter including means for detecting a standing out-of-range pin to stop the pinseter, a normally inoperative counter adapted to be actuated by the passage of pins in the pin handling mechanism, means responsive to determination of an out-of-range pin for enabling the counter, and time delay means responsive to restart of the pinsetter for disabling the counter after a predetermined time delay.

A further object is to provide an auxiliary pin detecting and counting means of the character mentioned wherein the pin handling mechanism includes a pin elevator for lifting pins from the pit of a bowling lane and a cross conveyor for receiving pins from the elevator for return to the bowling lane, and the counter includes a switch having an actuator in the path of pins moving serially along the cross conveyor.

An additional object of the invention is to provide an auxiliary pin detecting and counting means of the type described including a plurality of bistable electronic devices corresponding to fallen pins, and means connecting the switch and the bistable devices so that successive pins on the cross conveyor passing the switch actuator cause actuation of successive bistable devices to leave a number of the devices set corresponding in number to passing pins.

It is an object of the invention to provide in association with a pin handling mechanism for collecting fallen bowling pins from a lane pit and returning the pins to the lane surface, a pin detecting and counting means including a switch operable successively by pins moving serially in the pin handling mechanism, a plurality of bistable electrical devices corresponding to fallen pins, and circuitry connecting the switch and the bistable devices so that successive switch operation causes actuation of successive bistable devices, thereby providing an indication of the number of fallen pins.

Another object is to provide in association with an automatic pinsetter, a primary pin detection system adapted to determine pinfall when there are no standing pins out of its range, an auxiliary pin detection system operable in event of a pin standing out of the range of the primary pin detection system, means for detecting an out-of-range pin, and means responsive to detection of an out-of-range pin for disabling the primary pin detection system and enabling the auxiliary pin detection system.

A further object is to provide in an apparatus of the character mentioned a primary pin detection system comprising a plurality of switch devices corresponding respectively to pin positions on a bowling lane surface and operable after the rolling of each ball for signalling the presence or absence of standing pins, a plurality of bistable electrical buffer devices corresponding respectively to the pin detection switches for storing pinfall information, and circuit means connecting the switch devices and the buffer devices to actuate buffer devices corresponding to operated detecting switches, and the auxiliary pin detection system includes a single switch adapted to be operated successively by serially moving fallen pins, and circuitry connecting the last-mentioned switch to successively operate said buffer devices in event of an out-of-range pin.

Other objects and advantages of the invention will be apparent from the following description taken in connection with the accompanying drawings.

DETAILED DESCRIPTION—PINSETTER

Figure 1:
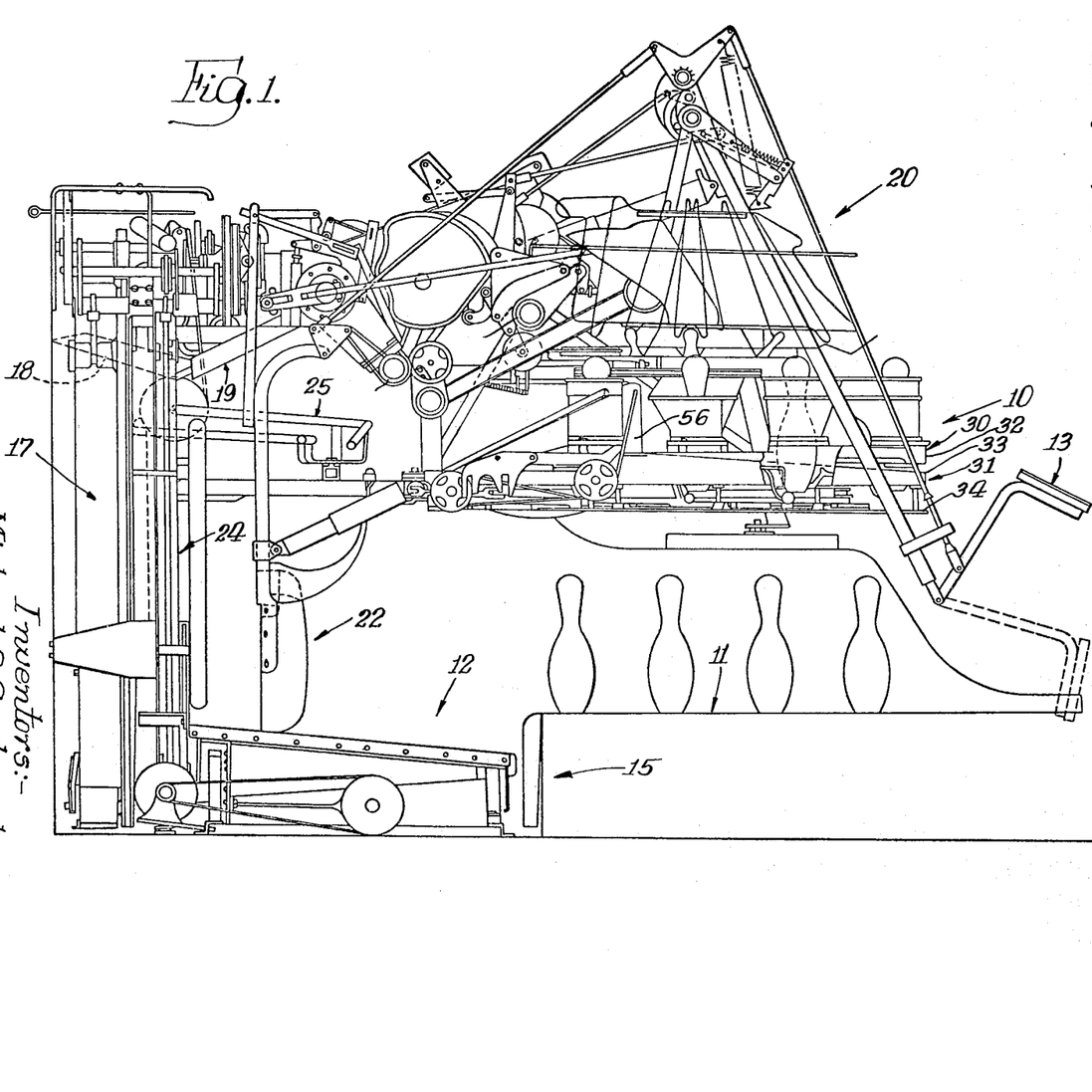
FIG. 1 is a side elevational view of a commercial Brunswick pinsetter available in the past.

The invention is directed to pin detection apparatus adapted for use with commercially available pinsetters such as those made by Brunswick Corporation, though utility need not be so limited. In the past, the Brunswick pinsetter has been made with a deck structure 10 for setting pins initially on a lane 11, for lifting standing pins after first ball while deadwood is removed from the lane and for resetting the lifted pins.

Fallen pins move rearwardly off the tail end of the lane into a pit area 12, some due to being struck by a moving ball or pin. In order to remove fallen pins remaining on the lane and standing pins after a frame, a rake 13 may be lowered and moved rearwardly after each ball is rolled. In the pit, a vibratory apparatus 15 causes the pins to move rearwardly. At the rear of the pit, a pin elevator 17 lifts pins from the pit to a turn-around pan 18 for directing pins, base first, to a cross conveyor 19 which in turn transports the pins forwardly to an indexable turret 20. Ultimately the turret drops the pins into the previously mentioned deck structure 10.

Spent balls move into the pit area and strike a pit cushion 22 to start the pinsetter which elevates the pit cushion when the rake is lowered. Elevation of the pit cushion allows the ball to move to a ball elevator 24 which delivers balls to a return system 25 leading to a ball storage rack at the approach end of the lane.

The first automatic pinsetter marketed by Brunswick is substantially described in Huck et al. Patent 2,949,300. The ball and pin handling mechanisms are described in more detail in Huck et al. Patent 2,967,708.

Currently, a revised pinsetter is marketed and referred to as the A–2. It is described in a Brunswick Corporation Automatic Pinsetter Service Manual, part No. 12–752828. Improvements in the later version primarily are a pit cushion and rake actuating mechanism of the type in Sondahl Patent 3,233,901, a deck lowering mechanism of the type in Rogers Patent 3,301,557, and a ball accelerator in the ball return system of the type in Gautraud Patent 3,018,104 and Rogers Patent 3,386,735.

Figure 2:
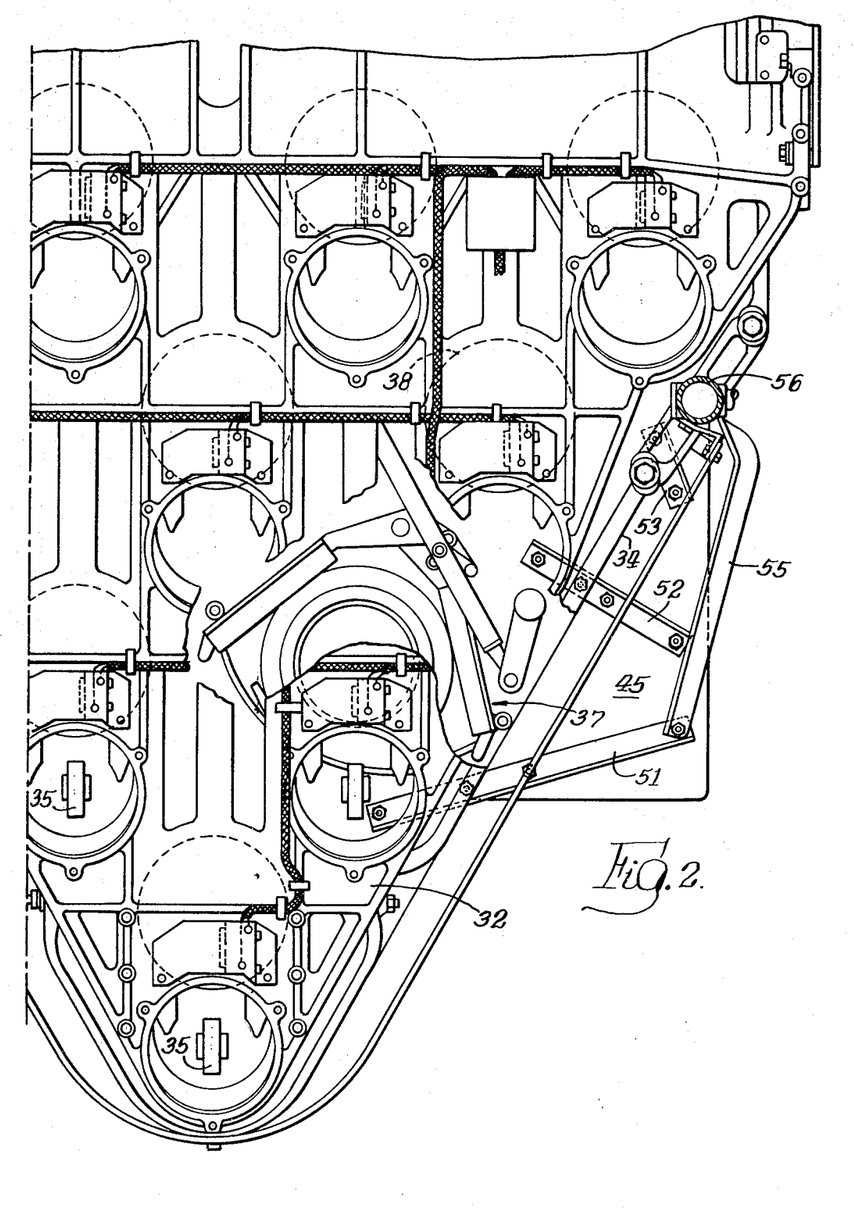
FIG. 2 is a fragmentary plan view of a pinsetter deck structure, partly broken away, and including an extension of the lower deck plate to enlarge the out-of-range pin detection area.

In the first commercial Brunswick automatic pinsetter, and in the later A–2 model, the deck structure has included a pair of triangularly shaped decks 30 and 31, one above the other, approximately in the shape of the triangular array of pin spots of the bowling lane surface, though larger. The upper deck includes a plate 32 and the lower deck of spaced upper and lower plates 33 and 34 rigidly secured together.

Both decks have a triangular array of ten openings for pins to pass through, but normally the openings in the two decks are not aligned. Instead, the apertures in the upper plate are disposed forwardly of the apertures in the lower plates so that pins may be held in the upper apertures resting on roller supports 35 on the lower deck preparatory to setting. When it is desired to set the pins, the entire deck structure is moved toward the lane surface and the upper deck is moved rearwardly relative to the lower deck to align the apertures in the two decks.

In order to lift standing pins from the lane to clear deadwood, the deck structure is lowered to engage the heads of standing pins while scissors mechanisms 37 grip the necks of the pins. The scissors mechanisms are positioned on the lower deck plate 34 adjacent the apertures therein. Above the lower apertures, on the bottom of the upper deck plate 30, there are rubber pads 38 to engage the heads of the pins standing when the deck is lowered. The combined action of the rubber pads and scissors holds the pins stationary on the deck structure when the latter is elevated so that deadwood can be removed. The area of each rubber pad on the upper deck plate corresponds at least approximately with the area of the associated apertures in the lower deck plate, and generally the apertures and pads are circular. The pin pickup mechanisms including the scissors devices and rubber pads are described in more detail in the aforementioned Sanford Patent 2,817,528.

Figures 3, 4, 7:
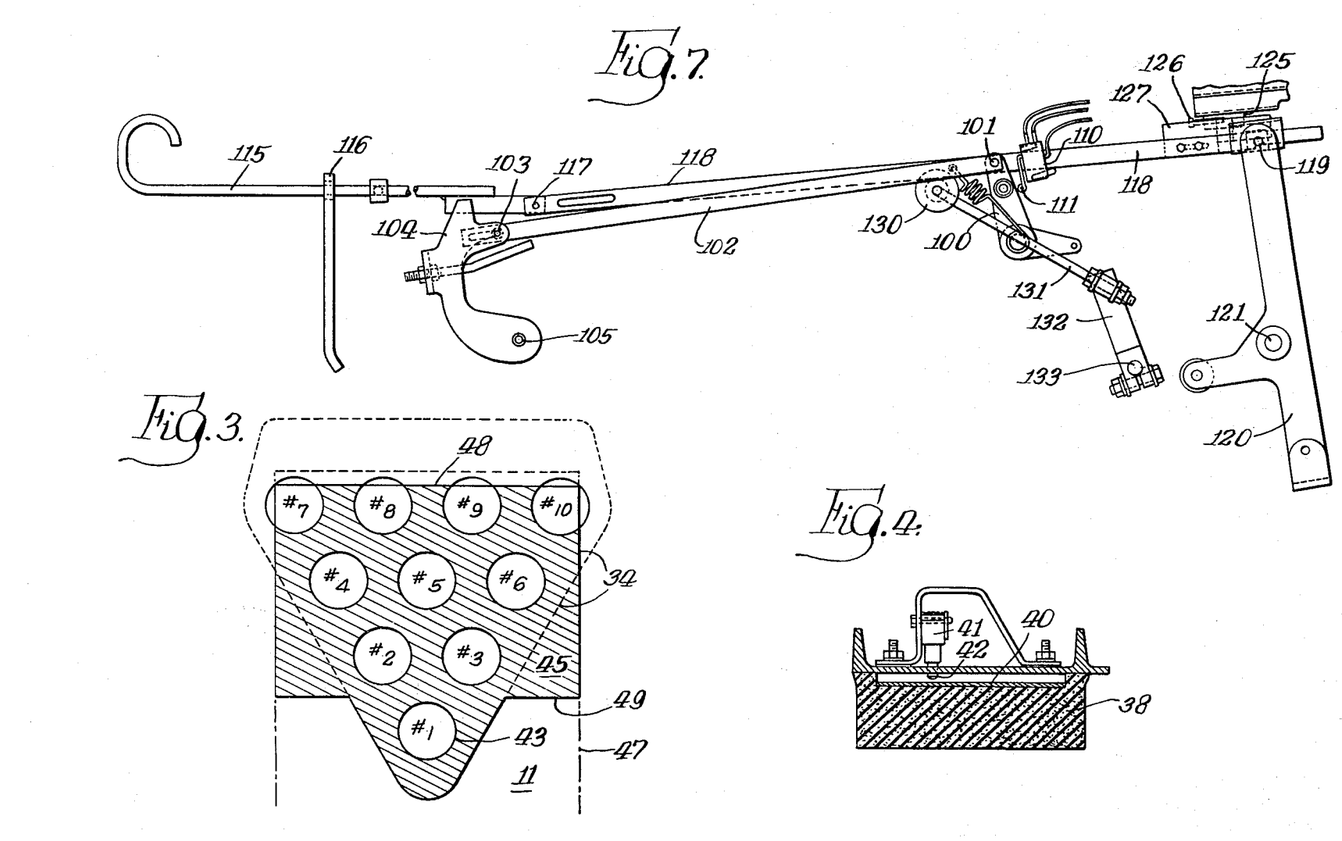
FIG. 3 is a diagram illustrating the primary pin detection area in contrast to the out-of-range pin detection area.
FIG. 4 is a sectional view illustrating a pin detection device in the primary pin detection system.
FIG. 7 is a view illustrating pinsetter control linkage and together with a switch actuated on detection of an out-of-range pin to enable the auxiliary counting system, and a switch actuated when the pinsetter is restarted to initiate a time delay before the auxiliary counting system is disabled.

As a practical matter, each aperture in the lower deck plate 34, each rubber pad 38 on the bottom of the upper deck plate, and each scissors mechanism 37 encompasses an area larger than the diameter of a pin and large enough that the pinsetter readily accommodates standing pins on spot and off spot in a predetermined area around each spot as a result of being nudged by a ball or pin without being felled. However, there are infrequent situations where a standing pin has moved far enough that it does not fit within an aperture in the lower deck plate when the deck structure is lowered and instead the head of the pin engages the lower deck plate 34, stopping the deck structure. This has been referred to as an "out-of-range" pin. In FIG. 3, the ten circular unshaded areas 43 correspond to the apertures in the lower deck plate and the rubber pads on the upper deck plate. Thus, they represent the in-range areas while the shaded areas are "out-of-range."

In operation of the pinsetter, the deck structure assumes five significant levels as follows: (1) a normal, uppermost retracted position where it receives pins and awaits other functions; (2) a slightly lower level where it is stopped by an out-of-range pin; (3) a middle level where it picks up standing pins and detects their presence; (4) a next lowest level where it detects a strike condition by virtue of the absence of all pins; and (5) a lowermost level for setting a new complement of ten pins.

Stoppage of the pinsetter deck at an "out-of-range" level has stopped the pinsetter to permit an attendant to remove the deadwood while leaving standing pins including out-of-range pin. The attachment then restarts the pinsetter to continue to cycle, raising the deck, but without the rake sweeping.

In the past, use has been made of pin detection means in the form of a rigid generally circular plate 40 disposed in a recess in the top of each resilient pad 38 on the bottom of the upper deck plate so as to be movable upwardly on contact of the rubber pad with the head of a standing pin. Movement of the plate is used to operate a switch such as a microswitch 41 having a switch actuating plunger 42 engageable with the plate 40 in the pad so that switch operation indicates presence of a standing pin and failure of switch operation indicates absence of a standing pin. Such a detection means is described in more detail in the aforementioned Torresen Patent 3,278,186.

In operation of the pin detection system with automatic scorekeeping apparatus, the occurrence of a standing pin out-of-range of the pickup mechanism also prevented automatic pinfall detection. Accordingly, no pinfall signal was set to the scorekeeper. This permitted accurate pinfall entry manually so as to take into account all the standing pins. Association of the pin detection system with automatic scorekeeping apparatus is described in the aforesaid Walker application Ser. No. 612,665 which also relates the scorekeeping apparatus to the pinsetter.

According to the present invention, the out-of-range pin detection area of the pinsetter deck structure has been enlarged in order to cover a greater area and provide a higher degree of accuracy in pinfall detection. In particular, as illustrated in FIG. 2, a triangular plate 45 has been added to the side edge of the lower deck plate 34 approximately midway between the forwardmost pin area and the rearmost pin area. As is well known in the art, the ten pin positions on the surface of the bowling lane are numbered from #1 to #10 beginning with the foremost pin and proceeding rearwardly in the succeeding rows, counting from left to right in each row, as illustrated in FIG. 3.

As will appear on reference to FIGS. 2 and 3, the plate 45 has an outer edge aligned with the outer edge of the bowling lane 11 as at 47 and a front edge approximately midway between the #1 pin and the row containing the #2 and #3 pins. The plate extends rearwardly to a position approximately in line with the #4, #5, and #6 pins. A similar complementary plate is provided at the opposite edge of the lower deck plate 34 so that a rectangular out-of-range pin detection area is provided extending in a lateral direction between the side edges of the lane surface and in a front-to-rear direction from the back edge of the lane surface at 48 forwardly to the line 49 immediately behind the #1 pin position. Additionally, the out-of-range detection area includes the generally triangular zone forwardly of the line 49.

The plate 45, as well as the complementary plate at the opposite side, may be attached to the deck plate 34 as by straps 51, 52 and 53 which are bolted to the top surface of the deck plate 34 and also bolted to the top surface of the added plate member 45. Additionally, a brace 55 extends upwardly and rearwardly from an anchor on the plate 45 to a post as at 56 which is rigid with the lower deck structure. The added plates 45 assure detection of an out-of-range pin sliding from the #1, #2 or #3 position under the area of the plates. It will be understood that the #2 and #3 pins could never slide forwardly of the line 49 and that the #1 pin could not slide directly laterally beyond the out-of-range area illustrated.

Figure 5:
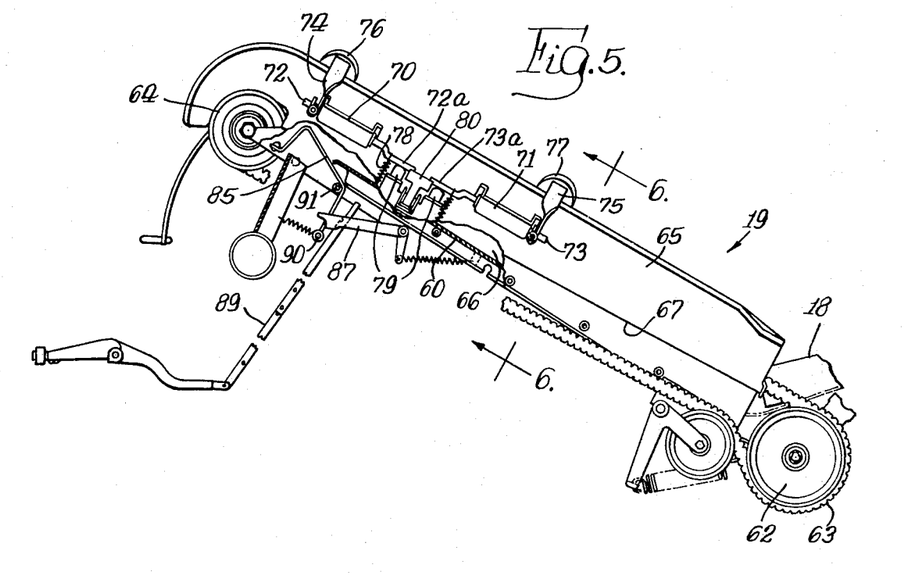
FIG. 5 is a side elevational view, partly broken away, illustrating the pinsetter cross conveyor, taken from the rear of FIG. 1.
Figure 6:
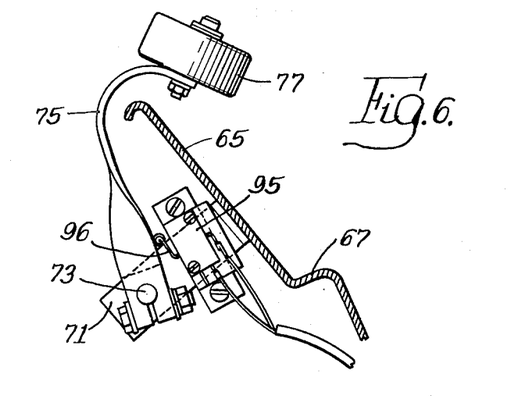
FIG. 6 is a sectional view illustrating the auxiliary counting switch associated with the cross conveyor, taken at about the line 6—6 of FIG. 5.

In the present invention the out-of-range pinfall counter is associated with the pinsetter cross conveyor. Referring now to FIGS. 5 and 6, in prior art pinsetters, the cross conveyor, which receives the pins from the pan or tray 18 for delivery forwardly to the turret 20 for reuse in the deck structure, includes an elongated bottom plate 60 of inverted channel shaped cross section. The bottom plate 60 extends from a position adjacent the tray 18 forwardly and upwardly to the discharge end of the conveyor adjacent the turret structure 20. Adjacent the rear end of the bottom plate 60, it carries a pair of coaxial conveyor pulleys as at 62. A pair of belts as at 63 pass around the pulleys 62 and around a pair of coaxial pulleys as at 64 at the discharge end of the conveyor.

The cross conveyor is formed with a trough by means of a pair of elongate sidewall plates 65 and 66 having lower edges attached to the side edges of the bottom plate 60. The side plates 65 and 66 extend substantially the entire length of the cross conveyor and each is formed with a longitudinal ledge as at 67 each adapted to support the upper reach of one of the belts 63. When the drive shaft supporting the pulleys 62 is driven as in the prior art pinsetters, pins delivered from the tray 18 with their base portions leading are engaged at the belly portions by the belts 63 so that the belly of a pin is adapted to be supported by the belt to convey the pin forwardly with its head resting on the bottom plate 60.

In order to control the flow of pins to the cross conveyor, the cross conveyor side plate 65 carries a pair of mounting brackets as at 70 and 71 and each mounting bracket carries a pivotable switch control shaft as at 72 and 73 on each of which there is fixed an arm as at 74 and 75. The arms 74 and 75 extend upwardly over the top edge of the side plate 65 and downwardly slightly into the trough of the cross conveyor. Each arm carries a roller as at 76 and 77 adapted to be engaged by the large belly portion of each pin passing upwardly along the cross conveyor to pivot the associated arms 74 and 75 at separate times about the axis of the pivotable shafts 72 and 73. The rollers 76 and 77 are utilized as detecting devices to determine when the cross conveyor has two pins thereon for purposes of controlling a microswitch as at 80 adapted to control a magnetic clutch to stop the pin elevator 17 so that additional pins will not be delivered to the cross conveyor. The switch 80 includes an actuating plunger controlled by both of the pivoted shafts 72 and 73. In particular, each of the shafts includes a bent end as at 72a and 73a biased by springs as at 78 in a direction to hold the switch actuating plunger in a switch open position. Preferably the force of the springs 78 is absorbed by stops as at 79 rather than by the switch.

In operation, if a first pin on the cross conveyor is stopped by a cross conveyor pin gate lever 85, the roller 76 is engaged by the pin, holding the lever 74 and the shaft portion 72a in a switch-releasing position. Now, if a second pin abuts the first pin, the second pin engages the roller 77, holding the arm 75 and shaft portions 73 in a switch-releasing position. Simultaneous operation of both switch controls allows the switch to operate, stopping the pin elevator and preventing a pin jam. On the other hand, if the pins continue to proceed singly along the conveyor with adequate space between them, the switch control levers 74 and 75 are usually not actuated simultaneously.

As is conventional in commercial pinsetters, the cross conveyor pin gate lever 85 is adapted to be held in a pin blocking position by latch 87 if the turret structure 20 is not in position to receive the pin progressing along the cross conveyor. When the turret structure properly receives a preceding pin and is still in need of additional pins, the turret indexes, and the indexing movement of the turret pivots a lever 88 clockwise. Return of the lever 88 counterclockwise to the position shown acts through a pin gate latch link 89 to lift the latch 87 off the end 90 of pin gate lever 85 so that the latter may swing about its pivot 91 and let the pin pass. If the turret becomes filled, it will not index to release the latch 87, as a result of which the pin gate 85 cannot pivot and pins are stopped. If the cross conveyor becomes loaded, that results in stopping the pin elevator as described above.

According to the present invention, in order to provide for counting pins downed where one of the standing pins is out of range of the pinsetter pickup mechanism and the primary pin detection system, a counter switch is provided on the cross conveyor. More particularly, as seen in FIG. 6, the mounting bracket 71 has a counter switch 95 mounted thereon including a switch actuating arm 96 adapted to be engaged by the trip lever arm 75. Thus, as each pin passes along cross conveyor 19, the large belly portion of the pin will engage the roller 77, pivoting the trip lever 75 and actuating the switch 95. As will appear hereinafter, the switch 95 is electrically arranged in a circuit in a manner such that the usual operation of the switch will have no effect when the primary pin detection system is able to detect all of the standing pins, that is, when all of the standing pins are within the range of the pin pickup mechanism. In the event of an out-of-range pin such that the pinsetter deck structure cannot descend to a level where the primary pin detection system will accurately sense all the standing pins, stoppage of the deck at the out-of-range level conditions the circuit including the out-of-range counter switch 95 such that the switch will be utilized to indicate the number of pins down by virtue of repeated actuation on the passage of each of the downed pins past the counter switch during return of the pins toward the deck structure from the pit.

Referring now to FIG. 7, there is an illustration of parts which are actuated when the pinsetter deck is stopped at a level indicating an out-of-range pin and also parts which are actuated when an attendant manually restarts the pinsetter. According to the present invention, in the event of a standing out-of-range pin, a switch is actuated which has the effect of disabling the primary pin detection system and enabling the secondary pin detection system. When an attendant has cleared the deadwood, restarting the pinsetter actuates a switch to begin a time delay at the end of which the secondary pin detection system is disabled and the primary system is again enabled.

More particularly, in the current commercially available Brunswick pinsetter, described in the Pinsetter Service Manual referred to above, there is an "out-of-range bellcrank lever" like that illustrated at 100 in FIG. 7. In the commercial pinsetter, the bellcrank lever 100 is pivotable on the "E" shaft of the pinsetter as illustrated, for example, in FIGURE 87 of the Pinsetter Service Manual. On occurrence of an out-of-range pin, the out-of-range bellcrank lever pivots in a clockwise direction as viewed in FIG. 7 as a result of conventional pinsetter controls. The upper end of the bellcrank lever 100 has a pivotal connection at 101 to a link 102 having its opposite end pivotally connected at 103 to an "out-of-range stop lever" as at 104 which is conventional in the commercially available Brunswick pinsetter and which is illustrated at FIGURE 12, for example, in the Pinsetter Service Manual. According to conventional operation of the pinsetter, clockwise movement of the bellcrank lever 100 pulls the link 102 which in turn pivots the stop lever 104 about its mounting 105. In a conventional manner, clockwise movement of the stop lever 104 results in disengaging the gear box clutch in the pinsetter to stop the drive to the pinsetter deck structure with the deck bearing against the standing out-of-range pin at 90° of 360° in the pinsetter cycle. While the machine is stopped, an attendant may move the deadwood from the pin area on the lane surface to the pit area while the vibrating pit floor, the pin elevator and the cross conveyor usually remain in operation, though they may be stopped by the attendant if desired.

According to the present invention, the motion of the bellcrank lever 100 as described above is utilized to actuate a switch 110 having a switch actuating lever 111 in the path of the bellcrank 100. The switch 110 may be referred to hereinafter as the "sense out-of-range" switch and is utilized to disable the primary pin detection system and enable the secondary pin detection system as set forth below. Since the disengagement of the gear box clutch merely stops the motion of the deck structure without stopping the pin handling mechanism, any pins which fall into the pit as a result of the ball thrown may promptly start the return passage through the pin handling mechanism toward the deck structure, actuating the cross conveyor counter switch along the way.

After the deadwood on the lane has been removed by the attendant, he is then in a position to restart the pinsetter operation, at which time it is desired that the gear box clutch be re-engaged, the deck elevated to the storage position and held, and the rake locked out so that it may not sweep standing pins. For such purpose, the conventional pinsetter includes a reset handle 115 accessible at the rear of the machine. The reset handle is slidably mounted at 116 and has a pivotal connection at 117 to link 118 having a pivotal connection at 119 to a "rake sweep hook cam follower" 120. When the reset handle 115 is pulled to the left as viewed in FIG. 7, it pulls the link 118 and follower 120. The pin in the pivotal connection at 117 between the handle 115 and the link 118 contacts the upper end of the out-of-range stop lever 104 returning it in a counterclockwise direction where the gear box clutch may be re-engaged to cause the pinsetter deck to be elevated. When the pin 117 pivots the out-of-range stop lever counterclockwise, a lost motion connection assures that the link 102 is not pulled to the left. Later, when the pinsetter is started, the bellcrank 100 returns counterclockwise, releasing the switch 110.

Pivotal movement of the follower 120 in a counterclockwise direction about a pivotal mounting 121 (referred to in the commercial pinsetter as the "D" shaft) controls the deck holding hook and the rake. In particular, such counterclockwise movement is greater than the usual movement of the follower as a result of which the follower cannot follow the cam it usually follows and instead latches the rake so that the rake cannot sweep. The motion also acts upon the deck-holding hook so that the deck is held up from 180° to 360° during an out-of-range cycle. The operation described is conventional in commercially available pinsetters and is described in the Pinsetter Service Manual referred to above. The rake sweep hook cam follower 120 is illustrated, for example, at FIGURE 90 in the Service Manual.

According to the present invention, motion of the link 118 to the left is viewed in FIG. 7 and has the effect of operating a switch as at 125 having a switch-actuating lever 126 engageable by a cam plate 127 on the link 118. As described hereinafter, operation of the switch 125 has the effect of starting a time delay period of fifteen seconds during which it is presumed that all of the pins knocked down by the ball creating the out-of-range situation will have passed the cross conveyor counter. At the end of the fifteen second delay, the pinsetter is electrically triggered, the cross conveyor counter is again disabled and the primary pin detection system is again enabled. In view of the function it performs, the switch 125 is referred to hereinafter as the "start time delay" switch.

It will be appreciated that if the out-of-range pin situation occurs on the first ball, it is desirable to leave the unfelled pins standing for delivery of the second ball according to the operation just described above. If the out-of-range pin occurs on the second ball, there is no need to prevent the sweep of the rake and indeed it is desirable to allow the rake to sweep all pins including standing pins into the pit preparatory to delivery of a new set of pins. To such an end, the pivotal connection of link 118 at 119 to the follower 120 is a releasable connection by virtue of which the end of the link 118 may be elevated relative to the pivot pin 119 so that motion of the link to the left to restart the pinsetter will not move the follower 120 in a counterclockwise direction.

In order to effect such disconnection at 119, the link 118 engages a roller 130 on an extension 131 to a lever 132 which has a position as illustrated in solid lines on awaiting first ball and a position as illustrated to the right in broken line on awaiting second ball. On movement of the lever clockwise to the broken line position, the roller 130 swings about the pivot axis 133 (referred to in the Pinsetter Manual as the "C" shaft), lifting the link 118 to disengage it from the pin 119. Thus, on restarting the pinsetter, after an out-of-range pin occurs on second ball, the switch 110 will be reset, the gear box clutch will be re-engaged and the time delay switch 125 will be actuated, but the rake will not be stopped from sweeping. It will be understood that it is contemplated that the fifteen second time delay from actuation of switch 125 will permit passage and counting of all the pins in the pit at the time the pinsetter is restarted but will exclude those pins which are later raked into the pit after the rake sweeps. The lever 132 is referred to in the Pinsetter Manual at FIGURE 134 as "first and second ball light selector," and is also shown in Brown Patent 3,116,064 which relates to the pinsetter strike detector.

Figure 8A:
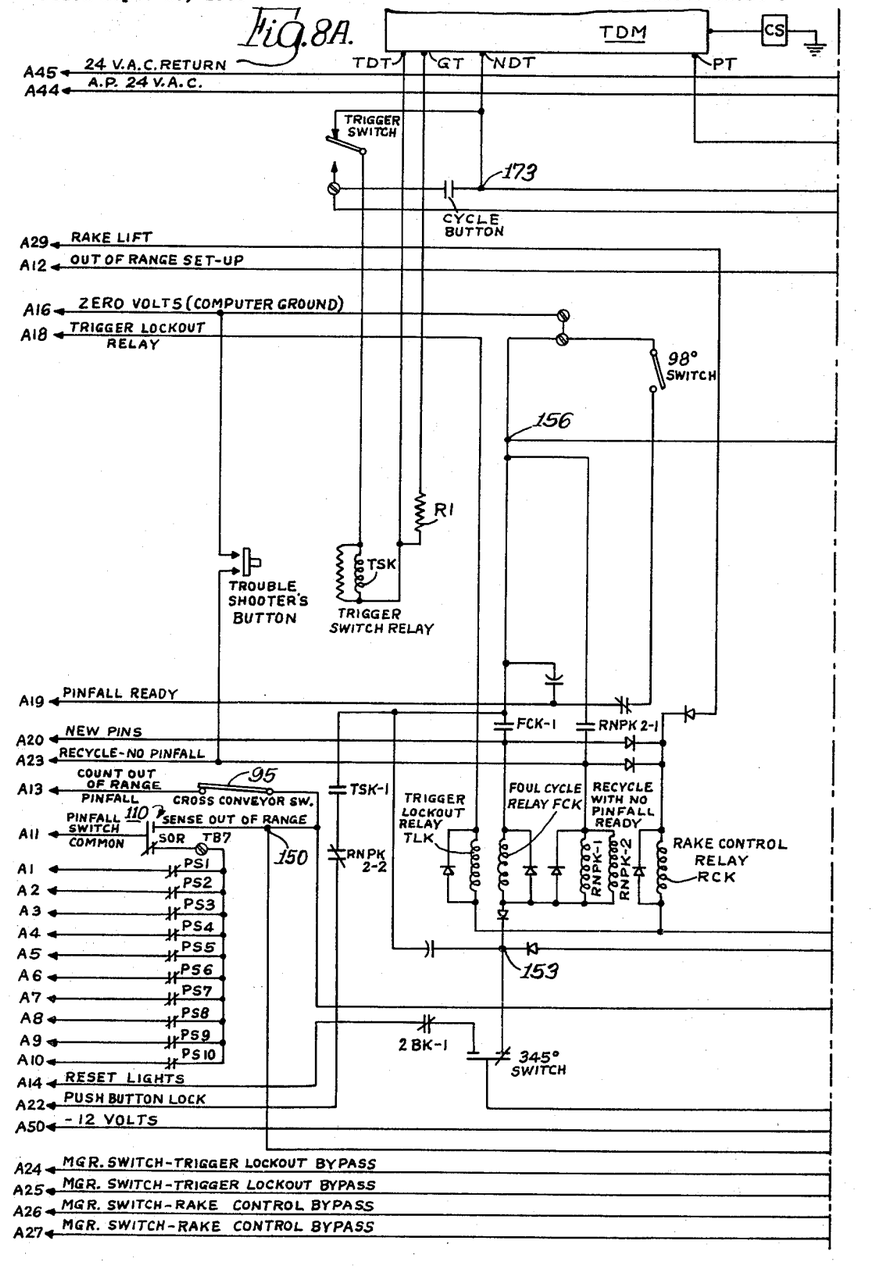
FIGS. 8A and 8B fit together side-by-side to provide a wiring diagram illustrating pinsetter operation.
Figure 8B:
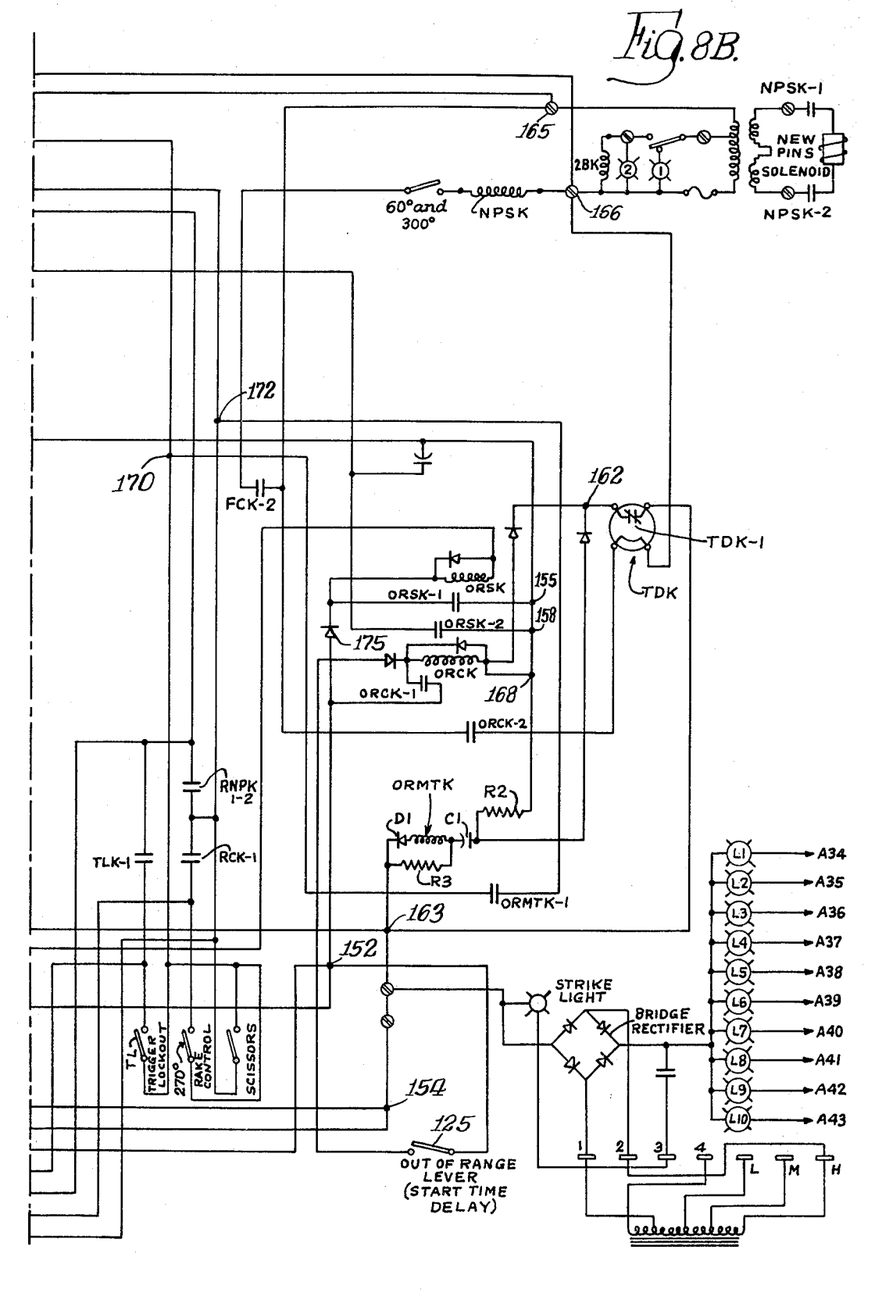

WIRING DIAGRAM OF FIG. 8

As described in the previously mentioned Walker application Ser. No. 612,665, in a pinsetter utilizing primary pin detection means as described above and associated with an automatic scoring device, the pinsetter normally cycles in the following manner in the absence of any out-of-range pins. When any ball is rolled, the ball striking the pit cushion causes movement of the pit cushion in a manner to actuate a mechanical linkage which causes the rake to lower preparatory to sweeping, as described in the aforementioned Rogers Patent 3,301,557. The motion of the mechanical linkage is utilized to operate a trigger switch TS (FIG. 8). As described in more detail below, the trigger switch is included in a circuit controlling a pinsetter cycle solenoid CS for starting the pinsetter to put the deck structure and the rake structure appropriately in motion. It has been conventional to energize the cycle solenoid through a time delay module TDM which delays the start of the pinsetter operation a predetermined time long enough to assure that any wobbling pins have the opportunity to fall. The manner in which the cycle solenoid starts the pinsetter is described in detail in the Pinsetter Service Manual referred to above and in particular is illustrated in FIGS. 10, 11, 13 and 48. As will appear, there are some circumstances when it is desirable to operate the cycle solenoid without a time delay.

After a first ball has been rolled, and the bowler has attained a strike by knocking down all pins, the deck of the pinsetter is lowered at about 90° in a 360° pinsetter cycle and finds no standing pins as a result of which it proceeds to the fourth level down and detects the strike condition. The deck then moves upwardly and the rake sweeps the fallen pins into the pit at about 180°. At about 270°, the deck comes down and spots a new set of pins on the lane surface. The deck and rake then return to their original positions at 360° and the lane is ready for the next ball.

During a first ball cycle when pins are left standing, the deck structure is lowered to the third level down where it finds the standing pins and the switches of the primary pin detection system are actuated corresponding to standing pins at about 90° in the cycle. The pin gripping scissors associated with the deck structure close on the standing pins and the deck returns upwardly as the rake sweeps the deadwood into the pit. At about 270°, the deck returns downwardly and resets the standing pins previously picked up. At 360°, the deck and rake return to their original positions and the lane is ready for the second ball in the frame.

As described in the Walker application, following the second ball, the deck structure will be moved downwardly in order for the pin detection means to determine whether there are standing pins so that appropriate pin detection switches will be operated. However, it is not necessary to lift the standing pins as their function has been completed, so that they are therefore not picked up and reset as after a first ball. Normal operation of the pinsetter blocks out operation of the cam follower for the scissors pickup on a second ball. After the detecting stroke of the pinsetter deck structure, it moves upwardly without the standing pins and remains up while the standing pins and fallen pins are swept into the pit by the rake. Following that, as in the normal second ball cycle, the deck returns downwardly at about 270° to set new pins.

In more detail, in the absence of out-of-range pins, when a ball strikes the pit cushion, the trigger switch TS (FIG. 8) is operated to open its normally closed contacts and close its normally open contacts so that a circuit is completed from the power terminal PT of the time delay module TDM through the trigger lockout switch TL (which is closed when the pinsetter is near 0° of its cycle), relay contacts TLK–1 (which are closed except when the trigger lockout relay TLK is deenergized by the scorekeeper), the now closed normally open contacts of the trigger switch TS, the trigger switch relay TSK, and the time delay terminal TDT of the time delay module TDM, as a result of which the pinsetter cycle solenoid CS will be energized after predetermined time delay has passed. At the same time, a circuit is completed through trigger switch relay TSK and resistance R1 in the ground terminal of the time delay module TDM so that the relay is promptly energized to close its contacts TSK–1 for a purpose that will appear.

As a result of energization of the cycle solenoid CS, the pinsetter is started and at about 90° the deck structure descends to a position where the primary pin detection switches as at 41 in FIG. 6 (designated PS1–PS10 in FIG. 8) are actuated to open positions corresponding to standing pins.

Figure 9:
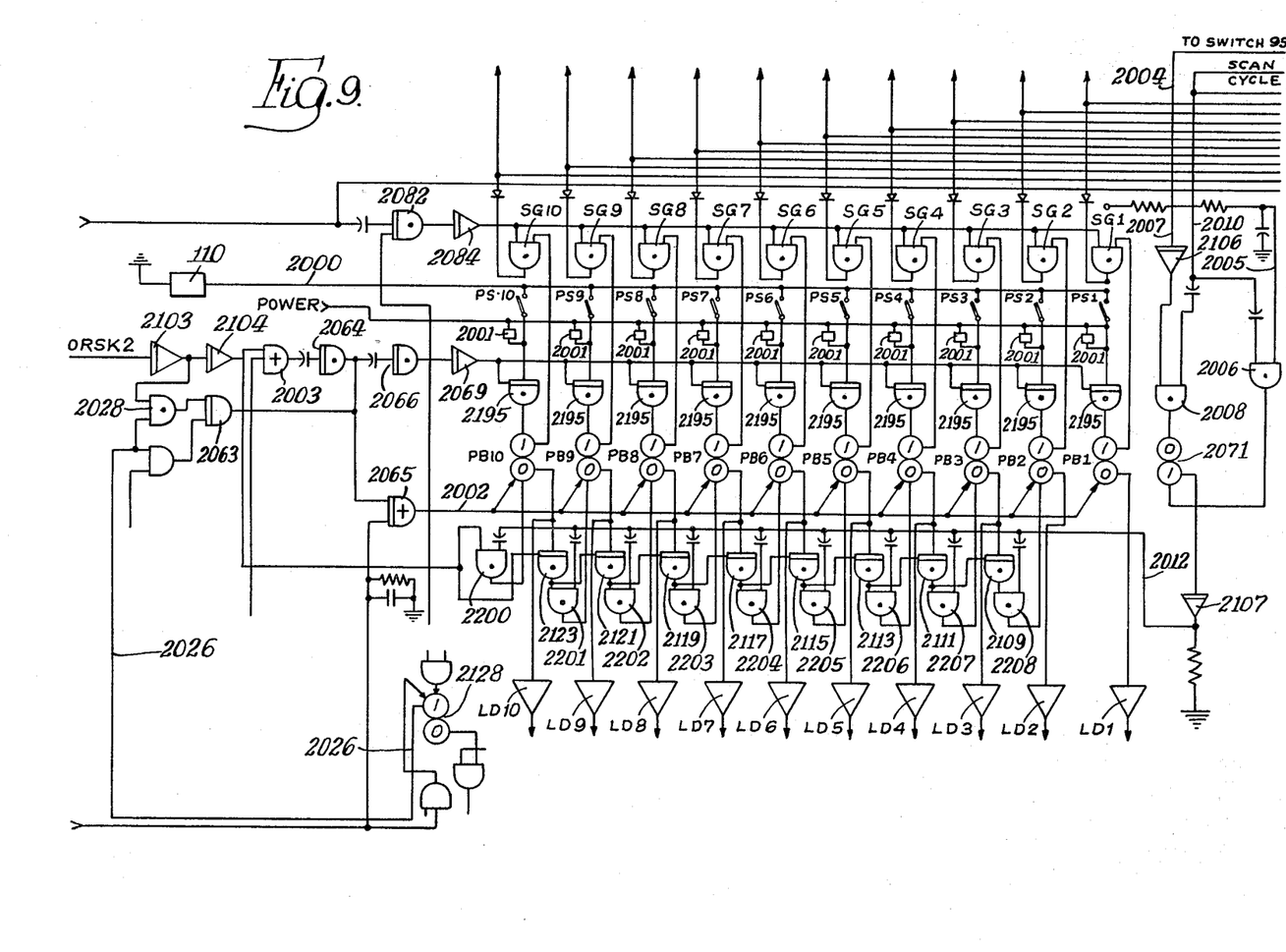
FIG. 9 is a logic diagram illustrating electronic circuitry including bistable buffer devices for storing pinfall information and adapted to be actuated alternatively by either the primary pin detection system or the secondary pin detection system for purposes of controlling an apparatus for automatically computing scores.

As described in the Walker application Ser. No. 612,665, the pin detection switches PS1–PS10 are associated with pinfalls buffer flip-flops PB1–PB10 in a manner such that unopened switches PS1–PS10 corresponding to downed pins have an effect such that no signal is provided to the corresponding pinfall buffer. On the other hand, open switches PS1–PS10 corresponding to standing pins have the effect of providing a signal to the corresponding pinfall buffers PB1–PB10. In this application, the switches PS1–PS10 correspond to similarly designated switches PS1–PS10 in the Walker application FIG. 6, and the pinfall buffers PB1–PB10 correspond to similarly designated buffers in FIG. 6 of the Walker application. In FIG. 9 of this application, the switches are shown in association with the buffers as taught in the Walker application. Accordingly, in a normal pinfall detection cycle when there is no out-of-range pin, the pinfall buffers are set as contemplated in the Walker application.

Shortly thereafter, at about 98° in the pinsetter cycle, a pinfall ready signal is supplied at the terminal A19 in FIG. 8 which connects to the similarly designated terminal in FIG. 9, as a result of which the pinfall information in the buffers is utilized in accordance with the teaching in the Walker application Ser. No. 612,655. The pinfall ready signal is provided when a switch in the pinsetter is operated at 98° (corresponding to the 105 degree switch in the Walker application), whereupon a circuit is completed from the terminal A19 through normally closed relay contacts RNPK2–1, the 98° switch and terminal A16 representing zero volts. As described in the Walker application, the pinfall information in the buffers is used both to indicate pinfall attributable solely to that ball and to compute cumulative score.

In the event there is a pin standing out-of-range of the pin pickup mechanism and the primary pin detection system after a ball has been rolled, when the pinsetter deck structure is lowered as described hereabove, the lowermost deck plate engages the top of the out-of-range pin, stopping the deck structure at the second highest level. The sense-out-of-range switch 110 is actuated so that the normally closed contacts are opened and the normally open contacts are closed. When the normally closed contacts are opened, the circuit is broken through the common leading to the primary pin detection switches PS1–PS10. All such switches are therefore effectively open and power through the network connection (FIG. 9) will produce a signal to the pinfall buffers as if all ten pins were standing, as will be described in more detail hereinafter.

Closure of the normally open contacts of the sense-out-of-range switch 110 enables a circuit through the cross conveyor counter switch 95 from the terminal A11, the now closed contacts of switch 110, and the terminal A13 leading to FIG. 9 so that as the passing pins successively close the cross conveyor counter switch 95 they will be counted in the pinfall buffers PB1–PB10.

Closure of the normally open contacts in the switch 110 additionally conditions the circuit through the start time delay switch 125 so that it may be effective at the appropriate time.

Closure of the normally open contacts of switch 110 also completes a circuit to energize a relay ORSK. The circuit is from terminal A11, the now closed contacts of switch 110, a junction 150, a junction 151, a junction 152, relay coil ORSK, a junction 153, the normally closed 345° switch, a junction 154 and terminal A50 which corresponds to −12 volts. Energization of the relay ORSK promptly results in closure of its contacts ORSK–1 which provide a holding circuit to ground through junction 155, junction 156 and terminal A16 which corresponds to zero volts.

Energization of the relay coil ORSK also results in a closure of its contacts ORSK2 which has the effect of grounding the gate 2103 in FIG. 9 by virtue of its connection from terminal A12 (FIG. 8) through contacts ORSK2, junction 158, junctions 155 and 156 and terminal A16. Grounding of the gate 2103 serves to prepare the circuitry of FIG. 9 for operation of the pinfall buffers PB10, etc., successively on repeated closure of the cross conveyor switch 95 as described in more detail hereinafter. Then, as the pins pass the cross conveyor switch 95, the latter is closed each time a pin passes, and a pulse is provided from the terminal A11 through the now closed contacts of switch 110, the junction 150, switch 95 and terminal A13, applying an enabling input to the AND gate 2006 for flip-flop 2071 in FIG. 9.

After the attendant has cleared the deadwood from the lane surface, he pulls the handle for restarting the pinsetter at which time the start time delay switch 125 is closed as described hereinabove. Closure of the switch 125 completes a circuit to relay coil ORCK from the junction 152, through the switch 125, the coil ORCK, the junction 162, the normally closed contacts in the time delay relay TDK, and junction 154. Energization of the coil ORCK energizes its contacts ORCK–1 to provide a holding circuit.

Energization of coil ORCK also effects closure of its contacts ORCK–2 to complete a circuit to the time delay relay TDK from the 24-volt source at terminal A44, through junction 165, contacts ORCK–2, TDK, junction 166 and the 24-volt return terminal A45.

After about fifteen seconds, the time delay relay TDK opens its normally closed contacts TDK–1 and the opening of such contacts removes a short circuit around relay ORMTK from junction 162 to junction 163. As a result, the relay is energized by virtue of the circuit from junction 168 through the resistor R2, the capacitor C1, and a coil ORMTK to junction 154.

Energization of the coil ORMTK results in closure of its contacts ORMTK–1 to energize the pinsetter without further relay. In particular, a circuit is completed from the power terminal PT of the time delay module TDM through junction 170, contacts ORMTK–1 and junction 172, junction 173 and the no-delay terminal NDT of the time delay module which has the effect of immediately energizing the pinsetter cycle solenoid CS without time delay.

When the time delay relay contacts TDK–1 open as described above, the −12-volt return for the coil ORCK is broken so that the relay now drops out, opening the contacts ORCK–2, interrupting the 24-volt power supply to the filament of the time delay relay. The time delay relay then drops out and restores the short around the relay ORMTK. The resistor R3 provides a discharge path for the capacitor C1 which has been charged to −12 volts, and the diode D1 in series with the coil ORMTK prevents reverse current flow through the relay on the discharge of the capacitor so that the relay will not operate spuriously a second time.

When the pinsetter is triggered as described immediately above and its cycle is resumed, actuation of the sense-out-of-range switch 110 is terminated and the switch returns to its normal state. As a result, a circuit is again conditioned from the terminal A11 through the normally closed contacts of switch 110 and the common for the pin detection switches PS1–PS10 preparatory for normal operation on the next pinsetter cycle. Reopening of the normally open contacts of switch 110 also drops the start time delay switch 125 out of circuit and drops the cross conveyor 95 out of circuit.

Return of the sense-out-of-range switch 110 to its normal position, leaving the normally open contacts open, additionally opens the circuit between terminal A11 and the relay coil ORSK, but the relay still remains operated by virtue of the blocking diode 175 and maintenance of the connection of the relay to ground through the 345° switch and terminal A50. The purpose of the continued operation of relay ORSK after return of the sense-out-of-range switch to its normal position will be disclosed hereinafter with respect to the out-of-range cycle.

Shortly after the pinsetter is triggered to resume its operation at 90°, it reaches 98° in the cycle at which time the 98° switch is actuated to provide a pinfall ready signal to the circuit of FIG. 9.

At 345° in the pinsetter cycle, the 345° switch is actuated to open its normally closed contacts, dropping the relay coil ORSK out.

In the circuit of FIG. 8, the switches identified as 98°, 60°–300°, 270° and 345° correspond respectively with switches identified in the Walker application 612,655 as 105°, 90°–330°, 270° and 350° and the functions are similar. In like manner, the switches identified in FIG. 8 as "trigger lockout" and "scissors" correspond to similar switches in the Walker application.

In FIG. 8, relays designated TLK, FCK and NPSK provide functions corresponding to similar relays in the Walker application. In FIG. 8 the "trouble shooters push button" provides for activation of relays RNPK–1 and RNPK–2 for purposes of recycling the pinsetter without producing a "pinfall ready" signal in the event that the pinsetter is out of step with the scorer or in the event that new pins might be desired because of improper setting of an original set, for example.

In FIG. 8, terminals A24–A27 provide for control at the manager's desk of an establishment for purposes of bypassing the trigger lockout and the rake control when it is desired to operate the pinsetter under circumstances where the scoring device is not being utilized.

In FIG. 8, the lamps L1–L10 are the masking unit lights for indicating standing pin positions when the primary pin detection system is utilized and they correspond to lamps similarly identified at FIG. 6 in the Walker application. Terminals A34–A43 associated with the masking unit lights connect to terminals similarly identified in FIG. 9. In operation of the secondary pin detection system in event of an out-of-range pin, the standing pin lamps are turned off sequentially from L10 downwardly corresponding to the number of fallen pins, so that the lamps then indicate the number of standing pins left, but not necessarily the actual pin positions as in normal operation.

PINFALL BUFFER CIRCUITRY OF FIG. 9

As set forth above, operation of buffers PB1–PB10 to accept pinfall information from detecting switch PS1–PS10 in the absence of an out-of-range pin is the same herein as in the Walker application.

Concerning operation in the event of an out-of-range pin, assuming a first ball condition, an out-of-range pin will operate the sense out-of-range switch 110 which opens the common lead 2000 to the pin detection switch PS1–PS10. A resistive network 2001 is connected to each of the pin detection switches PS1–PS10 in a manner similar to the network 190 in the above-mentioned Walker application. As a result, the side of each pinfall switch PS1–PS10 opposite the common lead 2000 will swing to the potential of the power source as though the pin finder switches PS1–PS10 were all open for an all pins standing condition.

Thus, one input to each of a series of NAND gates 2195 (functionally equivalent to gates 195 in the Walker application) is taken from the switches PS1–PS10 and each NAND gate 2195 will be provided with a PIN DETECTED STANDING signal in the manner mentioned in the Walker application.

It will be recalled that the relay ORSK was energized when an out-of-range pin was detected and the energization of the same causes the application of ground potential to inverter 2103 through relay contact ORSK–2. The inverter 2103 generates an output to an inverter 2104 which thereby provides a ground potential input to an OR gate 2003.

The presence of an input at the OR gate 2003 causes a pulse forming gate 2064 to generate a first READ pulse which is applied as an input to a NOR gate 2065; which, in turn, generates a reset pulse through a common lead 2002 to each flip-flop PB1–PB10 in the pinfall buffer to cause the same to be reset.

The trailing edge of the pulse from gate 2064 is also applied to a pulse forming gate 2066 which in turn activates an inverter 2067 to apply an enabling pulse to each of the NAND gates 2195.

From the foregoing, it will be apparent that each of the NAND gates 2195 has an appropriate signal on both of its inputs and as a result, each of the flip-flops PB1–PB10 will be set corresponding to a standing pin condition, thereby loading the pinfall buffer with "zero" pinfall.

The output of the inverter 2104 is also applied as an enabling input to an AND gate 2200 and to a NAND gate 2123 (which performs an AND function). The AND gate 2200 will apply a pulse to reset the pinfall buffer PB10 corresponding to a downed pin for the first pin counted on the cross conveyor out-of-range switch 95.

It will be recalled from the foregoing discussion that as downed pins are carried on the cross conveyor to the turret the count out-of-range switch 95 is operative to generate a signal on lead 2004 for each pin. The signal passes not only through lead 2005 to be applied as an enabling input to an AND gate 2006, but also passes through lead 2007 and is applied as an input to an inverter 2106 which acts to disable an AND gate 2008 to prevent the latter from resetting a flip-flop 2071.

As described in the Walker application, a number of clocks are present which generate pulses for controlling the sequence of operation thereof. One such clock is found in the scanning cycle control and pulses therefrom are applied to a lead 2010 to the AND gate 2006. When both a clock pulse and the count out-of-range pulse are present as inputs at the AND gate 2006, the AND gate 2006 will pulse the flip-flop 2071 to cause the same to be set. The output from the change in state of the flip-flop 2071 is inverted by an inverter 2107 and passes as a positive pulse through a common lead 2012 to pulse input leads on nine and gates 2200–2208.

It will be recalled that the output of the inverter 2104 has enabled the AND gate 2200 and as a result, when the first pulse is received by AND gate 2200 on lead 2012, the AND gate 2200 will generate a pulse to reset the pinfall buffer to correspond to a downed pin. As a result, the pinfall buffer will have a condition corresponding to one downed pin.

When the first pin has passed the count out-of-range switch 95 the switch will reopen and the input through lead 2007 will change potential so that inverter 2106 will now enable AND gate 2008. Thus, when the next clock pulse is received on lead 2010, AND gate 2008 will be enabled to reset the flip-flop 2071.

The changing of potential on lead 2007 due to the opening of the count out-of-range switch 95 also causes the AND gate 2006 to be disabled so that the clock pulse which causes the resetting of the flip-flop 2071 will not be passed as a setting input to the flip-flop 2071.

An output from the reset section of the flip-flop PB10 is applied as an input to the NAND gate 2123 along with an input taken from the output of the inverter 2104. When both such inputs are present (which will only be the case during an out-of-range pin condition and after the pinfall flip-flop PB10 is reset by the first pin passing through the count out-of-range switch 95) the output of the NAND gate 2123 will enable the AND gate 2201. Previously the NAND gate 2123 disabled the AND gate 2201 because the flip-flop PB10 was not in a set condition so that the first pulse passed along lead 2012 would not be passed through the AND gate 2201.

When the second out-of-range pulse from switch 95 is received, the output of the inverter 2106, will, as previously, disable AND gate 2008 and enable AND gate 2006. Thereupon, the next clock pulse will be passed through the AND gate 2006 to the flip-flop 2071 to cause the same to be set. The setting of the flip-flop 2071 will cause another pulse to be placed on lead 2012 in the manner described previously and in this instance because the AND gate 2201 has been enabled, the pulse will be passed therethrough to the flip-flop PB9 causing the same to be reset. Thus, the condition of the pinfall buffer will correspond at this point to two pins downed.

The previous enabling of the left-most NAND gate 2123 provides one enabling input to a NAND gate 2121 and the resetting of the flip-flop PB9 in a manner just described provides the NAND gate 2121 with its second enabling input. As a result, the AND gate 2202 now receives one enabling input so that when the third downed pin counted by switch 95 ultimately cause a pulse to be placed on lead 2012, the flip-flop PB8 may be reset.

The remainder of the AND gates 2203–2208 and NAND gates 2109, 2111, 2113, 2115, 2117 and 2119 are similarly connected to each other and their associated flip-flop PB7–PB2 and each operates similarly. The arrangement is such that initially, only the flip-flop PB10 may be reset. However, the resetting of the flip-flop PB10 by virtue of the arrangement of the gates 2202–2210 thereby conditions the flip-flop PB9 for resetting which, in turn, conditions the flip-flop PB8 for resetting, etc. More simply, the arrangement is much like that of a conventional ring counter except that as each succeeding flip-flop is reset, there is no change in condition of the flip-flop preceding it in the string.

From the foregoing it will be appreciated that all downed pins in the pit are counted as they go along the cross conveyor 65 to the turret and each such downed pin will ultimately cause one of the pinfall buffers PB1–PB10 to be reset to a downed pin condition. It will be noted that flip-flop PB1 of the pinfall buffer does not include a NAND gate corresponding to NAND gates 2109–2123 or an AND gate corresponding to AND gates 2201–2208 so that during an out-of-range pinfall cycle, the flip-flop PB1 will never be reset to correspond to a downed pin. The purpose of the omission of such gates is merely to provide a more economical construction in that the nature of the arrangement is such that if the flip-flop PB1 were to be reset corresponding to a downed pin, all of the preceding flip-flops PB2–PB10 would have to have been previously reset thereby indicating an all pins down condition. Of course, if all pins are downed, there will not be an out-of-range pin so that the out-of-range pin cycle will not take place. Stated another way, there must be at least one standing pin for an out-of-range pin cycle to take place and as a result, no more than nine of the pinfall buffer flip-flops will ever be reset.

The foregoing sets forth the general mode of operation for an out-of-range cycle. However, additional factors influencing operation, depending upon various situations relating to normal pinfall detection and out-of-range pinfall detection, must be considered. There are four such possible situations as follows.

(1) No out-of-range pin following either first or second ball in a frame (this may be disregarded as the operation is identical to that described by Walker);

(2) At least one out-of-range pin following both first and second balls in a frame;

(3) An out-of-range pin following the first ball in a frame but not following the second ball in a frame; and (4) No out-of-range pin following a first ball in a frame but an out-of-range pin following a second ball in a frame.

The mode of operation of the pinfall buffer flip-flops PB1–PB10 as described in the Walker application is such that, prior to their being loaded with pinfall information following each ball in a frame, they are normally reset. As a result, since only the pins knocked down following each ball are counted by the count out-of-range switch 95 (as opposed to the counting of both ball pinfall following the second ball in a frame by the normal pin detection switches PS1–PS10), some provision must be made for retaining a first ball pinfall so that second ball pinfall may be added thereto to arrive at a both ball pinfall total in the event of the occurrence of an out-of-range pin following the second ball or both balls in a frame.

This is accomplished by inhibiting the normal resetting of the pinfall buffer flip-flops PB1–PB10 and the reading of the pin detecting switches just prior to entry of the second ball pinfall information. More specifically, there is provided a flip-flop 2128 which is connected into the circuitry of the Walker scorer so as to be set when the scorer is scoring a second ball situation. An output of the set section of the flip-flop 2128 is placed on lead 2026 as an input to an AND gate 2028. A second input to the AND gate 2028 is derived from the output of the inverter 2103. As a result, when the inverter 2103 receives the input mentioned previously indicating that an out-of-range pinfall cycle is to take place and when the flip-flop 2128 indicates that a second ball cycle is to occur, the AND gate 2028 provides a signal which is utilized as an input to a NOR gate 2063 (used as an OR).

When the NOR gate 2063 receives the signal from the AND gate 2028, the output of the NOR gate 2063 is such as to connect the output of the first pulse forming read gate 2064 to ground so that a read pulse cannot be issued to the second read gate 2066 nor can the read pulse be issued to the gate 2065 to cause resetting of the flip-flops PB1–PB10. Thus, first ball pinfall information, whether for a first ball out-of-range cycle or for a normal first ball cycle will be preserved in the pinfall buffer flip-flops PB1–PB10 in the event of an out-of-range cycle following the second ball in a frame.

Where both balls have resulted in an out-of-range pin being present, the second ball pinfall causes the sequential resetting of an appropriate number of the flip-flops PB1–PB10 from a point starting with the first set flip-flop from the left in FIG. 9 remaining after the resetting of certain flip-flops following the first ball out-of-range pinfall cycle. On the other hand, where pinfall is detected normally following the first ball in a frame, as viewed in FIG. 9, the first out-of-range pin count pulse received from the count out-of-range switch 95 will be directed to the left-most pinfall buffer remaining in a set condition even though there may be reset pinfall buffer flip-flops on either side thereof. In such a case, the resetting of the pinfall buffer flip-flops will not be a step-by-step situation as described previously but will nonetheless proceed from left to right as viewed in FIG. 9, skipping previously reset pinfall buffer flip-flops.

In the last case, wherein an out-of-range pin remains standing following a first ball but is picked up by the second ball so that an out-of-range cycle is not necessary following the second ball, the inverter 2103 will not receive a signal indicating that an out-of-range cycle is to take place and as a result, the NOR gate 2063 will allow the first pulse from a read gate 2064 to issue to pulse to both the second read gate 2066 and the NOR gate 2065 to cause both the resetting of the pinfall buffer flip-flops and the reading of the pin detection switches. As a result, the pinfall buffer will be loaded with pinfall information relating to both first and second ball from the pinfall detection switches in the normal manner.

In any of the preceding cases, the pinfall information contained in the pinfall buffer flip-flops PB1–PB10 is then read into the pinfall register when, at 98° of a pinsetter cycle, a CYCLE START pulse is applied as an input to a NAND gate 2082 and thereafter through an inverter 2084 to the steering gates SG1–SG10.

FIG. 9 also illustrates lamp drivers LD10–LD1 which are connected to respective ones of the pinfall buffer flip-flops PB10–PB1 such that when the flip-flops are set for a standing pin condition, the flip-flops output level will operate the associated lamp driver to iluminate a corresponding lamp L10–L1 in a conventional pinfall masking unit to indicate the standing pin. As a result, for an out-of-range cycle, initially, all of the flip-flops PB10–PB1 will be set as described previously so that all of the lamps L10–L1 are energized thereby indicating an all pins standing condition. During the out-of-range cycle, as the respective flip-flops PB10, PB9, etc. are reset in the manner described previously, the lamps associated with the respective flip-flops will be extinguished to give the appearance of a downed pin. This will give an accurate indication of the number of standing pins but will not indicate accurately the location of the standing pins. Thus, if desired, means may be provided to interrupt the lamp circuits when an out-of-range cycle occurs.

The foregoing description of a system for detecting and counting pinfall during both normal cycles and out-of-range cycles will result in the bowler scores being accurately computed when connected with the scoring system described in the above-identified Walker application. Additionally, if the so-called "cumulative" pinfall box scoring method is used, accurate box scores will be printed. However, if it is desired that the so-called "incremental" pinfall box scoring be done, some modification to the Walker system is required.

Figure 10:
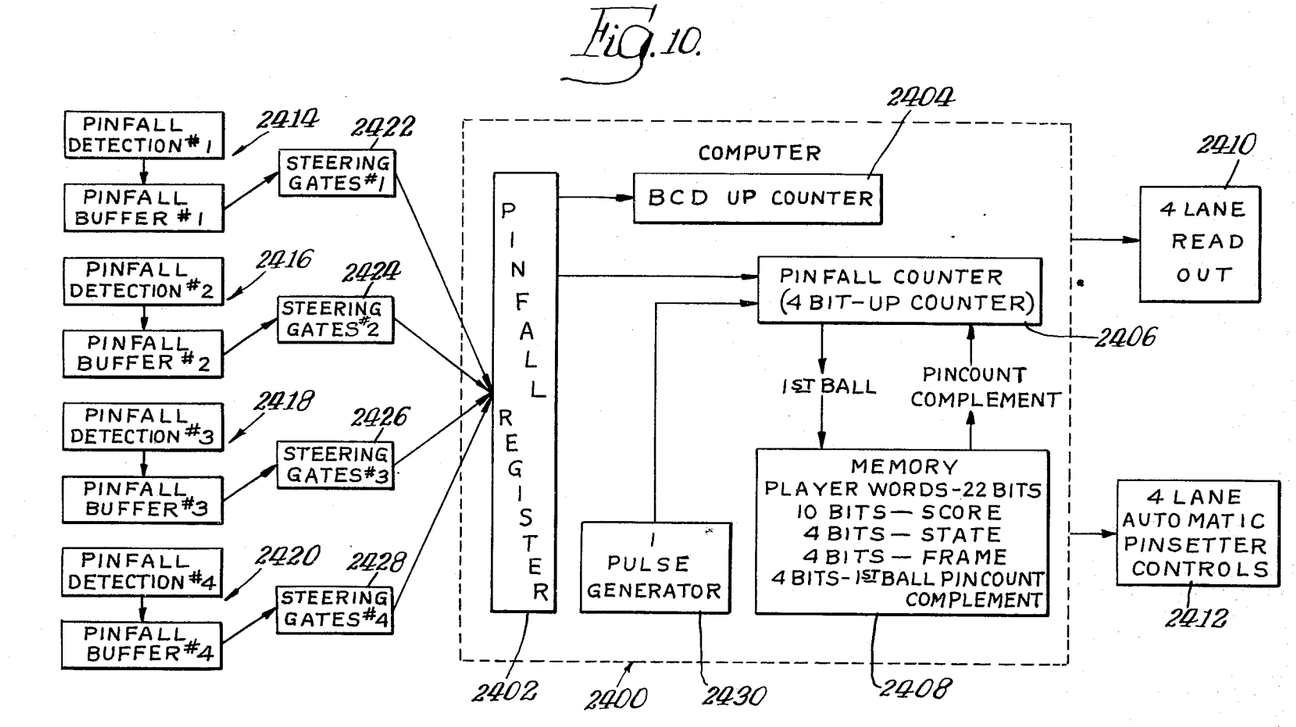
FIG. 10 is a block diagram indicating the manner in which the pinfall information from the buffers is used in the scorekeeping device.

FIG. 10 illustrates in block form a computer having the appropriate modifications. Pertinent portions of the computer, generally designated 2400, are indicated within the dotted line and are seen to comprise a pinfall register 2402 constructed in the manner described in the Walker application. Additionally, there is provided a binary coded decimal up counter 2402, again constructed in the manner described in the Walker application. Finally, there is provided a pinfall counter 2406 which is also constructed as disclosed in the Walker application.

The pinfall counter 2406 is a conventional four bit up counter and receives a string of pulses from the pinfall register to total the same to provide an indication of pin count for box score purposes.

The computer includes an expanded memory plane 2408. In the memory plane disclosed in the Walker application, each player word contains eighteen bits. In the expanded memory plane 2408, each player word contains twenty-two bits and the additional four bits are utilized for scoring the complement of first ball pin count and accordingly, appropriate connections are made between the memory 2408 and the pinfall counter 2406 so that the complement of first count pinfall may be taken from the pinfall counter 2406 and stored in the memory 2408. Such connections are made similarly to the various register-memory connections described by Walker.

Also provided are suitable readout means 2410 and four lane automatic pinsetter controls 2412 as described in the Walker application, the latter including such modifications as may be required by the teachings set forth herein.

Finally, there are provided four pin detection systems and pinfall buffer systems constructed as described herein and designated 2414, 2416, 2418, and 2420 for operating steering gate systems 2422, 2424, 2426 and 2428 in the manner described in the Walker application. The steering gate systems 2422–2428 operate to provide pinfall information corresponding to the condition of the respective pinfall buffer to the pinfall register 2402 in the manner described in the Walker application.

The modified system operates as follows. When pinfall information is placed in the pinfall register 2402 and to be totalled for box score purposes, the pinfall register is operated to cause a string of pulses corresponding to pins downed to be placed on the input of the pinfall counter 2406. If this is the first ball in a frame, the pin count contained in the pinfall register 2402 will indicate the number of pins achieved by the first ball in a frame. Thereafter, the complement of first ball pinfall will be read out of the pinfall counter 2406 to be written in the appropriate four bits in the memory 2408 and stored therein until the computer is to undergo a second ball cycle for the same player. At that time, the four bits containing the complement of first ball pin count are read back into the pinfall counter 2406 prior to operation of the pinfall register.

Additionally, an extra pulse is added to the pinfall counter 2406 by means of a one pulse generator 2430. The one pulse generator 2430 may be in any conventional form and, for that matter, may simply comprise an appropriate gate arranged to provide one pulse to the pinfall counter 2406 at a desired point in the bowler score cycle disclosed in the Walker application. Thereafter, the pinfall register 2402 is again operated and since, at this time, the pinfall register will contain information relative to pinfall achieved by both balls in a frame, both ball pin count will be added to the complement of first ball pin count plus one.

Those skilled in the art will recognize that such an addition is functionally equivalent to the subtraction of first ball pin count from first and second ball pin count so that the condition of the pinfall counter 2406 at this time will correspond to second ball pin count only. This condition may then be decoded and read out in the manner described in the Walker application.

It is intended by reference hereinabove to the Brunswick Automatic Pinsetter Service Manual, the prior U.S. patents, and the copending application to incorporate the content thereof into this application.

What is claimed is:

1. In a pin handling apparatus for receiving pins from the pit end of a bowling lane and transporting the pins to positions where they are reset on the bowling lane including a pin conveyor and a pin pickup mechanism for lifting standing pins from the bowling lane following the first ball in a frame while deadwood is swept from the lane, a counter switch adapted to be actuated successively by pins passing along the conveyor, a counting circuit associated with a counter switch adapted to indicate the number of pins passing along the conveyor responsive to actuation of the switch, means normally disabling the counting circuit, means for detecting a pin standing on the lane surface out of range of the pickup mechanism, and means responsive to the out-of-range detection means on occurrence of an out-of-range pin for enabling the counting circuit.

2. A combination as defined in claim 1, wherein the counting circuit includes a plurality of bistable electrical devices corresponding to fallen pins, and means connecting the counter switch and the bistable devices so that successive actuation of the switch causes actuation of successive bistable devices to set a number of the devices corresponding in number to passing pins.

3. In a pinsetter having a deck structure for initially setting pins on the surface of a bowling lane, picking up standing pins after the first ball in a frame while deadwood is swept away and resetting the lifted pins, a rake structure for sweeping fallen pins from the lane surface into a pit at the end of the lane, a pin handling mechanism for conveying pins from the pit to the deck structure, means for detecting a pin out of range of the pickup mechanism, means responsive to the out-of-range detector for stopping the pinsetter while an attendant removes deadwood without lifting standing pins, and manually operable means for restarting the pinsetter after clearance of deadwood, a normally inoperative counter adapted to be actuated by the passage of pins in the pin handling mechanism, means responsive to the out-of-range detector for enabling the counter, and time delay means responsive to restart of the pin-setter for disabling the counter after a predetermined time delay.

4. A combination as defined in claim 3 wherein the pin handling mechanism includes a pin elevator for lifting pins from the pit, and a cross conveyor for receiving pins from the elevator for return to the deck structure, and the counter includes an actuator in the path of pins moving serially along the cross conveyor.

5. A combination as defined in claim 4 wherein the pin handling mechanism includes a turret structure for receiving pins from the cross conveyor for delivery to the deck structure.

6. In a pin handling mechanism for collecting fallen bowling pins from a pit at the end of a bowling lane and returning the pins to the lane surface, a pin detecting and counting means including a switch operable successively by pins moving serially in the pin handling mechanism, a plurality of bistable electrical devices corresponding to fallen pins, and circuitry connecting the switch and the bistable devices so that successive switch operation causes actuation of successive bistable devices to provide an indication of the number of fallen pins.

7. In a pinsetter, a pin pickup mechanism for lifting standing pins from the surface of a bowling lane while deadwood is swept therefrom, a primary pin detection system associated with the pin pickup mechanism and normally operative to determine the presence of standing pins when there are no pins standing out of range of the pickup mechanism, a normally inoperative auxiliary pin detection system for determining pinfall in event of a pin standing out of range of the pickup mechanism, means for sensing an out-of-range pin and means responsive to the out-of-range sensing means for disabling the primary pin detection system and enabling the auxiliary pin detection system.

8. A combination as defined in claim 7 wherein the primary pin detection system includes a plurality of switch devices corresponding respectively to pin positions on a bowling lane surface and operable after the rolling of each ball for signaling the presence or absence of standing pins, a plurality of bistable electrical storage devices corresponding respectively to the pin detection switch positions for storing pinfall information, and circuit means connecting the switch devices and the storage devices to actuate the storage devices to indicate pinfall.

9. A combination as defined in claim 7 wherein the auxiliary pin detection system includes a plurality of bistable electrical storage devices corresponding to fallen pins for storing pinfall information, a switch adapted to be operated successively by serially moving fallen pins and circuitry connecting the switch to successively operate said storage devices on successive operation of the switch.

10. In a pin handling apparatus for receiving pins from the pit end of a bowling lane and transporting the pins to positions for reset on the bowling lane including a pin conveyor and a primary pin detection system for sensing standing pins on the bowling lane, a feeler associated with the conveyor and adapted to be actuated successively by passing pins along the conveyor, an indicator responsive to the feeler and adapted to indicate the number of pins passing along the conveyor responsive to actuation of the feeler, means normally disabling the indicator, means for detecting a pin standing on the lane surface out of the range of the primary pin detection system, and means responsive to the out-of-range detection means on occurrence of an out-of-range pin for enabling the indicator.

11. A combination as defined in claim 10 wherein the pin handling apparatus comprises a deck structure movable toward and away from the surface of a bowling lane and including means for lifting standing pins from the surface of the lane after the first ball in a frame while deadwood is swept away and then resetting the lifted pins in the form of a plurality of resilient pads on the deck structure engageable with the tops of the standing pins and grippers to engage the necks of the standing pins, and the primary pin detection system comprises a plurality of switch devices associated respectively with the resilient pads for operation by standing pins.

12. A combination as defined in claim 11 wherein the primary pin detection system includes a plurality of bistable electrical storage devices corresponding respectively to the pin detection switches for storing pinfall information, and circuit means connecting the detecting switch devices and the storage devices to actuate the storage devices corresponding to actuated switch devices, and the out-of-range pin indicator includes a switch associated with the conveyor feeler for actuation thereby, and circuitry connecting the last-mentioned switch to successively operate said storage devices in event of an out-of-range pin.

13. A combination as defined in claim 12 wherein the resilient pads are recessed upwardly in the deck structure above the bottom surface thereof and the pads and associated grippers respectively encompass each an area corresponding to the associated pinspot and a predetermined area surrounding the pinspot, and out-of-range pins miss the resilient pads and engage the bottom surface of the deck structure when the later is moved toward the surface of the lane, and the out-of-range pin detecting means includes a switch, and the pin handling apparatus includes a deck moving mechanism operative to actuate the out-of-range detector switch when the deck is lowered and engages the head of an out-of-range pin.

14. In a pin handling apparatus including a deck structure movable toward and away from the surface of a bowling lane, for depositing an initial set of ten pins on the lane surface in a triangular pattern with the base of the triangle adjacent the end of the lane, lifting standing pins after the rolling of a first ball in a frame while deadwood is swept away and resetting the lifted pins on the lane surface for the rolling of a second ball in a frame, and including a triangular lower deck and an upper deck movable rearwardly relative to the lower deck, with apertures in the upper deck adapted to receive a full complement of pins to be set, supports on the lower deck for holding pins in the apertures in the upper deck, apertures in the lower deck adapted to register with apertures in the upper deck when the latter is moved rearwardly relative to the lower deck, resilient pads on the bottom of the upper deck over the apertures in the lower deck when the upper deck is in its forwardmost position engageable with standing pins on the lane surface when the deck structure is lowered to a place where standing pins project through the apertures in the lower deck, grippers on the lower deck engageable with the necks of standing pins engaged by the resilient pads, and means for detecting a pin standing out of range of the lower deck apertures, the resilient pads and grippers when the lower deck around the apertures engages the top of the out-of-range pin, the improvement comprising means for enlarging the out-of-range pin detection area including an extension plate disposed at each side of the lower deck plate along the edge extending from the apex to the base in the plane of the lower deck, together with means for securing the extension plates in position in the form of straps attached thereto and attached to the lower deck.

15. In a pin handling apparatus including a deck structure movable toward and away from the surface of a bowling lane, for depositing an initial set of ten pins on the lane surface in a triangular pattern with the base of the triangle adjacent the end of the lane, lifting standing pins after the rolling of a first ball in a frame while deadwood is swept away and resetting the lifted pins on the lane surface for the rolling of a second ball in a frame, and including resilient pads engageable with standing pins on the lane surface when the deck structure is lowered, grippers engageable with the necks of standing pins engaged by the resilient pads, and means for detecting a pin standing out of range of the resilient pads and grippers when the deck structure around the pads and grippers engages the top of the out-of-range pin, the improvement comprising means for enlarging the out-of-range pin detection area including an extension plate disposed at each side of the lower surface of deck structure along the edge extending from the apex to the base in the plane of the lower deck surface, together with means for securing the extension plates in position in the form of straps attached thereto and attached to the deck structure.

16. A combination as defined in claim 15 wherein the pin positions on the deck structure are numbered from 1 to 10 beginning at the apex and proceeding rearwardly, counting left to right in succeeding rows, and each extension plate is triangular in shape and includes a long side edge adjacent the edge of the deck structure, a base leg extending laterally outwardly from a position between the #1 pin position and the row including the #2 and #3 positions, and an upright leg approximately aligned with the outermost edge of the outermost pin position and terminating approximately at the rearmost edge of the row including the #4, #5 and #6 pin positions.

References Cited

UNITED STATES PATENTS

| | | |
|---|---|---|
| 2,670,205 | 2/1954 | Sherman. |
| 2,671,549 | 3/1954 | Lubetkin. |
| 3,094,327 | 6/1963 | Whang et al. |
| 3,307,847 | 3/1967 | Kostopoulos et al. |

ANTON O. OECHSLE, Primary Examiner

U.S. Cl. X.R.

235—92; 273—54